May 9, 1933.  R. A. CHRISTIE  1,907,737

SPOON OF PAPER OR LIKE MATERIAL

Filed March 3, 1932

INVENTOR
Robert A. Christie
BY
Augustus B. Stoughton
ATTORNEY.

WITNESS:

Patented May 9, 1933

1,907,737

UNITED STATES PATENT OFFICE

ROBERT A. CHRISTIE, OF GLENSIDE, PENNSYLVANIA

SPOON OF PAPER OR LIKE MATERIAL

Application filed March 3, 1932. Serial No. 596,493.

The invention will be described as embodied in a spoon but the intention is to embody the invention in a fork as well as a spoon because in most instances and in this class of articles a fork is substantially a spoon cut to provide tines.

The principal object of the present invention is to strengthen the article at the union of the handle and bowl, while at the same time providing an attractive appearance and an article which can be conveniently made. Another object of the invention is to provide an article of the character referred to possessed of comparatively great strength and rigidity and yet capable of comparatively inexpensive manufacture.

Other objects of the invention will appear from the following description at the end of which the invention will be claimed.

Generally stated, the invention comprises a spoon of paper, fiber or like material having a rib upstanding from the central portion of its handle and providing a generally flat marginal flange, said upstanding rib extending into the concavity of the bowl of the spoon, said marginal flange and the wall of the bowl being provided at the union of the bowl and handle with upstanding extensions disposed substantially parallel with the walls of the rib to reinforce the spoon at the union of the handle and bowl.

The invention also comprises the improvements to be presently described and finally claimed.

In the following description reference will be made to the accompanying drawing forming part hereof and in which Figure 1 is a top plan view of a spoon embodying features of the invention looking at the concave side of the bowl.

Figure 1:
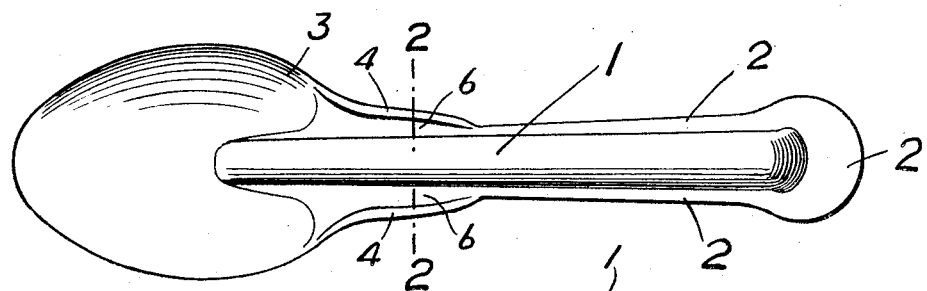
Figure 2:
Fig. 2 is a sectional view taken on the line 2—2 of Fig. 1.
Figure 3:
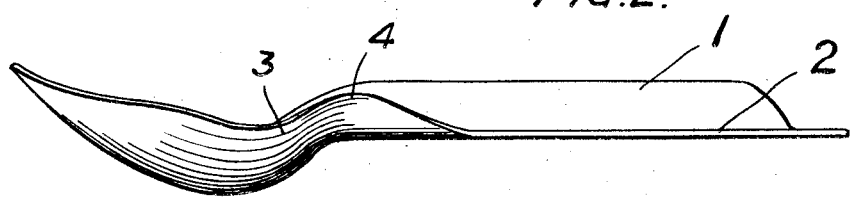
Fig. 3 is a side view of the spoon.
Figure 4:
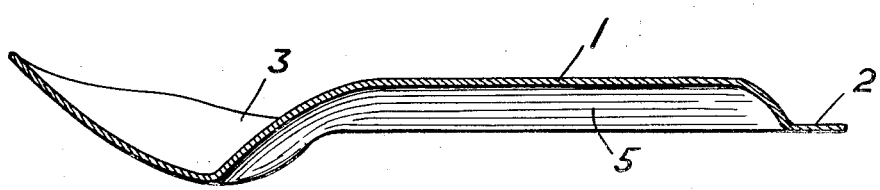
Fig. 4 is a transverse sectional view of the same.
Figure 5:
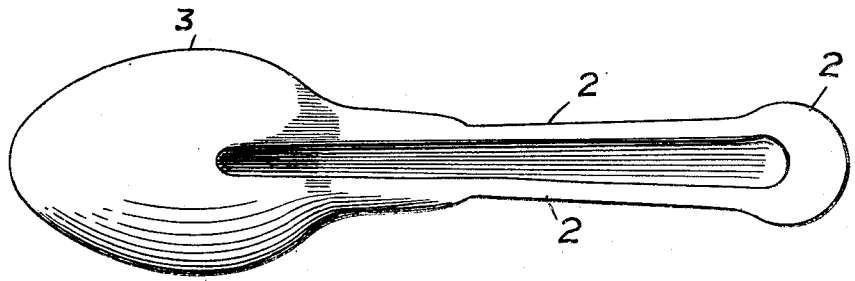
Fig. 5 is a plan view looking at the convex side of the bowl.

In the drawing 1 is a rib upstanding from the concave side of the bowl and extending from the central portion of the handle and providing a generally flat marginal flange 2. The upstanding rib 1 extends into and stands up from the concave side of the bowl of the spoon. The marginal flange 2 and the wall 3 of the bowl are provided at the union of the bowl and handle with upstanding extensions or wings 4 disposed generally parallel with the walls 5 of the rib and terminating substantially flush with the top of the rib. 6 represents valleys paralleling the rib and widening out into the bowl of the spoon.

The purpose of the described construction is to provide a strong, rigid spoon or fork of paper, fiber or like material characterized by strength at and in the neighborhood of the union of the handle and bowl.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A spoon of paper or like material having a rib upstanding from the central portion of its handle and providing a generally flat marginal flange, said upstanding rib extending into the concavity of the bowl of the spoon, said marginal flange and the wall of the bowl being provided at the union of the bowl and handle with external upstanding extensions disposed substantially parallel with the walls of the rib and flush with the top thereof to reinforce the spoon at the union of the handle and bowl.

2. A spoon of paper or like material having a rib upstanding from the central portion of its handle and providing a generally flat marginal flange, said upstanding rib extending into the concavity of the bowl of the spoon, said marginal flange and the wall of the bowl being provided at the union of the bowl and handle with external upstanding extensions disposed substantially parallel with the walls of the rib to reinforce the spoon at the union of the handle and bowl.

ROBERT A. CHRISTIE.